United States Patent Office 3,167,505
Patented Jan. 26, 1965

---

3,167,505
PROCESS FOR DESCALING SEA WATER
Maria G. Dunseth, Arlington, Va., and Murrell L. Salutsky, Silver Spring, Md., assignors to W. R. Grace & Co., New York, N.Y., a corporation of Connecticut
No Drawing. Filed Sept. 7, 1962, Ser. No. 222,192
1 Claim. (Cl. 210—28)

This invention relates to the treatment of metallic cation-containing brines, such as sea water. In one aspect, the invention relates to a method for the preparation of sodium phosphate by utilizing fertilizer grade calcium phosphates dissolved in sea water. In another aspect, the invention relates to a process whereby scale-forming elements can be removed efficiently and inexpensively from sea water, thereby rendering the latter more suitable for desalination by distillation or other conventional means.

Sea water contains a considerable amount of metal salts which are scale-forming, such as magnesium and calcium. Upon the conversion of sea water to fresh water by distillation or electrolysis, scale formation within the apparatus increases and a large amount of scale is accumulated. This reduces the efficiency of the apparatus and requires periodic shutdowns for cleaning. What is desired is a process which will remove the scale-forming elements from sea water at sufficiently low cost to make it commercially feasible.

In Salutsky et al. Patent No. 3,042,606, there is described a method for precipitating metallic cations from sea water by adding phosphoric acid to the sea water and neutralizing with ammonia. The precipitation reaction for magnesium (assumed present in the sea water as chloride) is shown by the following equation:

(1) $MgCl_2 + H_3PO_4 + 3NH_3 + 2H_2O \rightarrow MgNH_4PO_4 \cdot 6H_2O + 2NH_4Cl$ It can be seen that three moles of ammonia are consumed to neutralize the acid and that two moles of ammonia remain in the descaled sea water as ammonium chloride. If an inexpensive method could be developed for producing disodium phosphate or monosodium phosphate, then precipitation of the metal ammonium phosphates could be carried out more economically according to the following equations, where Me is a metallic cation capable of forming a metal ammonium phosphate:

(2) $MeCl_2 + Na_2HPO_4 + NH_3 \rightarrow MeNH_4PO_4 + 2NaCl$ (3) $MeCl_2 + NaH_2PO_4 + 2NH_3 \rightarrow MeNH_4PO_4 + NH_4Cl + NaCl$ In reaction (2), there is no waste or loss of ammonia, whereas in reaction (3), half the ammonia remains in the descaled sea water as ammonium chloride and hence must be considered lost. In either case, however, the efficiency with which the ammonia is used is obviously considerably higher than that in the process indicated in reaction (1).

The simplest method for producing sodium phosphates involves the neutralization of phosphoric acid with either sodium hydroxide or carbonate. However, unless some waste source of alkali is found, this method is not especially economical.

It is an object of this invention, therefore, to provide a method for the production of a source of phosphate lower in cost than phosphoric acid for use in sea water descaling processes. It is a further object of this invention to provide an efficient and economical scheme for the descaling of sea water. It is still a further object of this invention to provide a process whereby sea water is economically descaled, and useful metal ammonium phosphates are recovered as by-products. Other objects will become evident in the following description.

Normal superphosphate and triple superphosphate (common commercial fertilizers) are known to be cheap sources of water soluble phosphate. Normal superphosphate is primarily a mixture of monocalcium phospate and calcium sulfate (gypsum) while triple superphosphate is essentially all monocalcium phosphate. We have found that monosodium phosphate can be prepared from superphosphate by first leaching superphosphate with sea water until a saturated solution of monocalcium phosphate in sea water is obtained. The relative quantities in which these reactants are combined would of course depend upon the chemical composition of the superphosphate and the amount of salt dissolved in the sea water. In general, a quantity of superphosphate sufficient to give a saturated solution of calcium phosphate should be employed for optimum results. (Alternatively, phosphate rock can be reacted with sulfuric acid, hydrochloric acid, or phosphoric acid, and the resulting calcium phosphate dissolved in sea water to form a saturated solution.)

This saturated solution is then passed through an ion exchange bed comprising a strongly acidic cation exchange resin in the sodium form, such as Dowex 50 (Dow Chemical Company) or Amberlite IR–120 (Rohm and Haas). This ion exchange process can be fixed bed, continuous, cyclone, or any other procedure achieving a similar result. Most of our ion exchange treatments were carried out at room temperature at a flow rate of 0.25 gallon/ft.$^3$/minute, for a column 36 inches high. However, these specifications are by no means critical; the determining factor is that the solution must flow through the resin at a rate such that no calcium ion is detectable in the effluent. The presence of calcium ion is indicative of a too rapid flow rate, or that the resin needs regeneration. The effluent from this treatment is a solution of monosodium phosphate in sea water. The manner in which the solution is treated by the resin can be shown by the following equation:

(4) $2R\text{---}Na + Ca(H_2PO_4)_2 \rightarrow R_2Ca + 2NaH_2PO_4$

This ion exchange process also removes other interfering cations from the sea water solution of monocalcium phosphate, such as magnesium ions and the like, substituting sodium ions therefore. Thus, the final solution is essentially a solution of sodium phosphate suitable for treating larger quantities of sea water, with only non-interfering foreign salts being present.

The ion exchange resin can be easily and inexpensively regenerated with waste evaporator brine or other salt solution containing 6% or more sodium chloride, in accordance with the following reaction:

(5) $R_2\text{---}Ca + 2NaCl \rightarrow 2R\text{---}Na + CaCl_2$

The invention as stated above can be readily incorporated into a large-scale overall scheme for the descaling of sea water. Assuming that it is desired to descale a large quantity of sea water, a small percent of the total volume of sea water is separated from the remainder, and this small portion is treated with phosphate fertilizer and ion exchange resin as described above. The quantity of water to be so treated would depend, of course, on the concentration of scale-forming elements in the sea water and upon the concentration of other foreign ions, taking into consideration their effect upon the solubility of calcium and sodium phosphate. In general, we have found that this quantity ranges from 2 to 3% to no more than 40% of the total volume of sea water to be descaled. The resulting solution is then returned to the remainder of the total volume of sea water along with the necessary quantity of ammonia, and scale-forming elements are removed as indicated in Equations 2 and 3. As a result, the total volume of sea water is thereby rendered suitable for conventional desalination techniques.

The instant invention can be further understood by a consideration of the following examples, none of which are intended to be limiting thereon.

EXAMPLE I

*Extraction of monocalcium phosphate from triple superphosphate with sea water*

A 200 gram sample of triple superphosphate was placed in a Buchner funnel and leached with approximately one liter of sea water in small portions. The leachate was collected for phosphate analysis. Experimental data are shown in Table I. A total of 71.90 grams of $P_2O_5$ was recovered in a volume of 968 milliliters of leachate. The starting triple superphosphate contained 48.70% $P_2O_5$, of which 40.90% was water soluble. This represents approximately 88% of the water soluble $P_2O_5$ in the sample of triple superphosphate.

TABLE I.—EXTRACTION OF MONOCALCIUM PHOSPHATE FROM TRIPLE SUPERPHOSPHATE WITH SEA WATER

| Sample No. | Volume of Sample (ml.) | Weight of $P_2O_5$ in Sample (g.) | Total Volume Through Cake (ml.) | Weight of $P_2O_5$ left in Cake (g.) |
|---|---|---|---|---|
| 1 | 100 | 12.90 | 100 | 67.26 |
| 2 | 110 | 12.21 | 210 | 55.05 |
| 3 | 96 | 12.19 | 306 | 42.86 |
| 4 | 90 | 8.01 | 396 | 34.85 |
| 5 | 90 | 6.66 | 486 | 28.19 |
| 6 | 166 | 8.96 | 652 | 19.23 |
| 7 | 86 | 4.81 | 738 | 14.42 |
| 8 | 110 | 3.52 | 848 | 10.70 |
| 9 | 120 | 2.64 | 968 | 8.26 |
| Total | 968 | 71.90 | | |

EXAMPLE II

*Extraction of monocalcium phosphate from triple superphosphate with sea water*

A sample of 1,000 grams of triple superphosphate containing 40.90% water soluble $P_2O_5$ was placed in a Buchner funnel; approximately 2 liters of raw sea water (1.65% chlorinity) were percolated through the funnel. A filtrate of 1,800 milliliters was collected and passed through a Dowex-50 ion exchange column. The resin had the following characteristics.

Screen grading (wet): 20-50 mesh (U.S. Standard Screen)
Moisture content: 51.66%
Swelling: Volume changes were negligible when converting the resin from the sodium to calcium form The column was 36 inches high, with a volume of 1,580 milliliters and containing 654 grams of dry resin. The column containing the resin was treated with the solution of monocalcium phosphate at 25° centigrade at an average flow rate of 0.25 gallon/ft.$^3$/min. Samples were collected and quantitatively analyzed for calcium by titration with a solution of ammonium oxalate. The monocalcium phosphate solution was passed through the column until a trace of calcium appeared in the effluent from the column. The effluents from the column were consolidated into three fractions. The first fraction of 510 milliliters did not contain phosphate or calcium. (This represents the water initially present in the column before the addition of solution, or the "column volume.") The second fraction of 610 milliliters contained 419.55 milliequivalents of monosodium phosphate and was free of calcium. The third fraction of 670 milliliters contained 863.63 milliequivalents of monosodium phosphate and 8.04 milliequivalents of calcium. The two fractions which contained monosodium phosphate had a combined volume of 1,280 milliliters and contained 1,283.18 milliequivalents of monosodium phosphate. This represented a resin capacity of 1.96 milliequivalents per gram of dry resin. The overall recovery of phosphate was about 90%.

EXAMPLE III

*Extraction of monocalcium phosphate from normal superphosphate with sea water*

The normal superphosphate used in this example contained 17.0% water soluble $P_2O_5$.

A sample of 1,000 grams of normal superphosphate was slurried with approximately five liters of raw sea water slightly acidified by the addition of one milliliter of phosphoric acid. The slurry was filtered and a total of 5 liters of solution was recovered. The solution containing the soluble phosphate was passed through an ion exchange column as described in Example I. Five liters of effluent free of calcium were collected containing 1,695.5 milliequivalents of monosodium phosphate. The capacity of the resin in this example was 2.59 milliequivalents per gram of dry resin.

EXAMPLE IV

*Regeneration of column*

The Dowex-50 column described in Example I was treated with a 6% sodium chloride solution. A conversion of 100% to the sodium form was obtained after passing through the column 31.8 liters of the sodium chloride solution.

The success with which the monosodium phosphate solution prepared in accordance with our invention can be utilized is indicated by the following data. These figures indicate the quantities of scale-forming metallic cations precipitated from raw sea water by monosodium phosphate solutions prepared from fertilizer grade phosphate. (It is to be noted that the natural pH of the raw sea water used was 7.8.)

TABLE II.—PHOSPHATES PRECIPITATED FROM SEA WATER

| | | | | | |
|---|---|---|---|---|---|
| pH of precipitation | 6.5 | 7.0 | 7.5 | 7.9 | 8.5 |
| Wt. of precipitate (grams) | 15.0 | 17.2 | 18.5 | 19.2 | 19.0 |
| $P_2O_5$ (percent) | 29.70 | 29.70 | 29.50 | 29.80 | 29.40 |
| N (percent) | 4.34 | 4.42 | 4.44 | 4.36 | 4.26 |
| MgO (percent) | 14.85 | 14.86 | 14.74 | 14.29 | 14.42 |
| CaO (percent) | 2.37 | 2.67 | 2.98 | 3.45 | 3.81 |
| $P_2O_5$/N | 6.84 | 6.71 | 6.64 | 6.83 | 6.90 |
| Weight Recovered, g.: | | | | | |
| Mg | 1.343 | 1.541 | 1.644 | 1.654 | 1.695 |
| Ca | 0.254 | 0.328 | 0.394 | 0.474 | 0.518 |
| $P_2O_5$ | 4.455 | 5.108 | 5.457 | 5.721 | 5.586 |
| N | 0.651 | 0.760 | 0.821 | 0.850 | 0.809 |
| Percent Recovery: | | | | | |
| Mg | 79.7 | 91.4 | 97.5 | 98.1 | 100.0 |
| Ca | 47.6 | 61.5 | 73.9 | 88.8 | 97.0 |
| $P_2O_5$ | 76.0 | 87.1 | 93.1 | 97.6 | 95.3 |

From the foregoing description, it can readily be seen that we have an economical method for the production of sodium phosphate solutions from superphosphate fertilizer and sea water. Further, it can be seen that we have developed a method whereby scale-forming metallic cations can be inexpensively and effectively removed from raw sea water using superphosphate fertilizers as a source of phosphate for precipitation.

We claim:

A method for the descaling of sea water comprising the steps of:

(a) separating from the total volume of seawater to be descaled a smaller quantity of sea water comprising no more than 40% of the total volume;

(b) leaching a superphosphate fertilizer from the group comprising normal superphosphate and triple superphosphate with said smaller quantity of sea water, forming thereby a sea water solution which is saturated with respect to calcium phosphate;

(c) passing said sea water solution through an ion exchange bed comprising a strongly acidic cation exchange resin in the sodium form at a rate such that no calcium ion is detectable in the effluent;

(d) recovering said effluent;

(e) returning said effluent to the bulk of the sea water from which it had initially been separated along with a suitable quantity of ammonia;
(f) precipitating out scale forming metallic cations from said sea water as metal phosphates;
(g) recovering the resulting descaled sea water; and
(h) regenerating said cation exchange resin with an aqueous solution containing at least 6% sodium chloride, thereby rendering it suitable for re-use in step (c) above.

References Cited in the file of this patent

UNITED STATES PATENTS

| | | |
|---|---|---|
| 2,330,865 | Butzler | Oct. 5, 1943 |
| 3,042,606 | Salutsky et al. | July 3, 1962 |